(12) United States Patent
Goma et al.

(10) Patent No.: US 7,876,970 B2
(45) Date of Patent: Jan. 25, 2011

(54) METHOD AND APPARATUS FOR WHITE BALANCING DIGITAL IMAGES

(75) Inventors: Sergiu Goma, Stouffville (CA); Milivoje Aleksic, Richmond Hill (CA)

(73) Assignee: Qualcomm Incorporated, San Diego, CA (US)

( * ) Notice: Subject to any disclaimer, the term of this patent is extended or adjusted under 35 U.S.C. 154(b) by 1175 days.

(21) Appl. No.: 11/331,932

(22) Filed: Jan. 13, 2006

(65) Prior Publication Data
US 2007/0165945 A1    Jul. 19, 2007

(51) Int. Cl.
*G06K 9/00* (2006.01)
(52) U.S. Cl. .................. 382/254; 345/589; 348/223.1
(58) Field of Classification Search ............... 382/100, 382/167, 254, 274, 275; 348/23.1, 256, 603, 348/612, 645, 665, 690, 703; 345/589
See application file for complete search history.

(56) References Cited

U.S. PATENT DOCUMENTS

| | | | | |
|---|---|---|---|---|
| 5,206,918 A * | 4/1993 | Levene | ..................... | 382/110 |
| 6,377,702 B1 | 4/2002 | Cooper | | |
| 6,654,493 B1 * | 11/2003 | Hilliard et al. | ............... | 382/167 |
| 6,677,958 B2 * | 1/2004 | Cottone et al. | .............. | 345/589 |
| 7,433,104 B2 * | 10/2008 | Cheo et al. | ................... | 358/520 |
| 2002/0131635 A1 | 9/2002 | Cooper | | |
| 2003/0025688 A1 * | 2/2003 | Cottone et al. | ............. | 345/207 |
| 2003/0035156 A1 | 2/2003 | Cooper | | |
| 2004/0202365 A1 * | 10/2004 | Spaulding et al. | ........... | 382/162 |
| 2005/0196037 A1 * | 9/2005 | Muenzenmayer et al. | ... | 382/159 |
| 2005/0275911 A1 * | 12/2005 | Yamada et al. | .............. | 358/518 |
| 2006/0023233 A1 * | 2/2006 | Madden | ..................... | 358/1.9 |
| 2006/0050335 A1 * | 3/2006 | Dorrell et al. | ............... | 358/516 |
| 2006/0262363 A1 * | 11/2006 | Henley | ........................ | 358/516 |
| 2006/0290954 A1 * | 12/2006 | Stokes et al. | ................. | 358/1.9 |

FOREIGN PATENT DOCUMENTS

WO     9701151 A     1/1997

* cited by examiner

*Primary Examiner*—Anand Bhatnagar

(57) ABSTRACT

At least one illuminant white point estimate is determined in a color space having radially defined saturation based on a reference image. A chromatic adaptation correction vector (CACV) is determined based on the at least one illuminant white point estimate. Corrected pixels are obtained by applying the CACV (preferably in a cone response color space using a correction matrix based on the CACV) to uncorrected image pixels corresponding to a target image, which may comprise the reference image or another image.

31 Claims, 6 Drawing Sheets

METHOD AND APPARATUS FOR WHITE BALANCING DIGITAL IMAGES

FIELD OF THE INVENTION

The invention relates generally to processing of digitally represented images and, in particular, to techniques for performing white balancing in such digitally represented images.

BACKGROUND OF THE INVENTION

Adaptation can be considered as a dynamic mechanism of the human visual system to optimize the visual response to a particular viewing condition. Dark and light adaptation are the changes in visual sensitivity when the level of illumination is decreased or increased, respectively. Human chromatic adaptation is the ability of the human visual system to compensate for the color of the illumination and to approximately preserve the appearance of an object. For example, chromatic adaptation can be observed by examining a white object under different types of illumination, such as daylight and incandescent. Daylight is "bluer": it contains far more short-wavelength energy than incandescent. However, the white object retains its white appearance under both light sources, as long as the viewer is adapted to the light source.

Image capturing systems such as scanners, digital cameras, digital camcorders or other devices, unlike human beings, do not have the ability to adapt to an illumination source. Scanners usually have fluorescent light sources. Illumination sources captured by digital cameras or camcorders, for example, typically vary according to the scene, and often within the scene. Additionally, images captured with these devices are viewed using a wide variety of light sources. To faithfully reproduce the appearance of image colors, it would be beneficial to compensate for the "cast" of the illuminant (i.e., the color contribution of the illuminant to the captured image) from captured images. Generally, the process of correcting for illuminant casts is termed "white balancing", referring to the desire to ensure that white objects in an image do in fact appear white, or as they would be seen under daylight conditions.

Various techniques exist in the art for performing white balancing. Ideally, such techniques should offer good accuracy and computational efficiency. Furthermore, it would be particularly advantageous to be able to perform white balancing "on the fly", i.e., without the need to store the full image prior to processing. However, current techniques tend to trade off performance for computational efficiency and vice versa. For example, U.S. Pat. No. 6,798,449 issued to Hsieh teaches a system in which image data in YCrCb format is operated upon to determine mean values for Cr and Cb over various regions within the image. Using Cr and Cb as coordinate axes, the mean values for each region are used as coordinates to determine, for each region or the image as a whole, which quadrants within the two-dimensional Cr-Cb chart include the coordinate data, thereby indicating illuminant cast contributions for each region or the image as a whole. Based upon the quadrant indicated for a given region or the entire image, gain adjustments are applied to red and blue. While this approach is relatively easy to implement, it offers a relatively simplistic treatment to the problem and its performance is limited because it operates in a color space (YCrCb) that has only a poor relation to perceived color space. On the other hand, U.S. Pat. No. 6,573,932 issued to Adams, Jr. et al. teaches a complex, computationally-intensive, iterative technique and, unlike Hsieh, performs color correction in a color space related to human perceptual capabilities. However, the color space used by Adams, Jr. et al. is a non-linear and thus not suited for a hardware implementation. Furthermore, the iterative nature of the technique requires storage of at least parts of the image.

Accordingly, it would be advantageous to provide a technique for white balancing that offers both good performance and relatively inexpensive computational complexity, which would relate to a simple hardware implementation, as well as the ability to be performed "on the fly", i.e., without the need to store the image.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Figure 1:
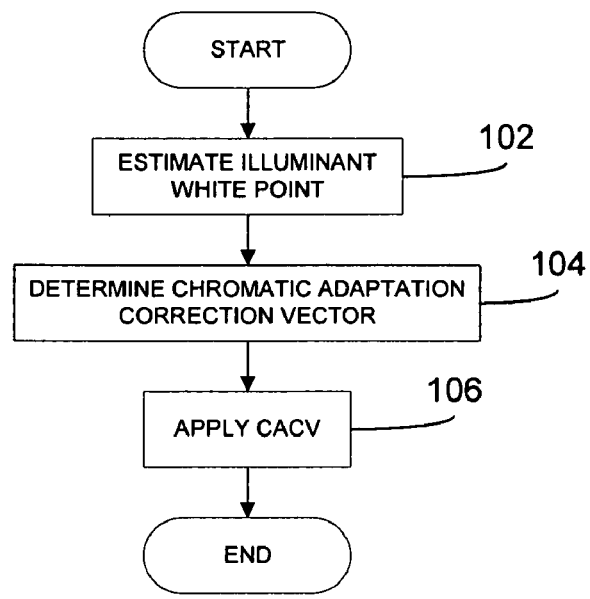
FIG. 1 is a flowchart illustrating processing in accordance with the present invention.

Briefly, an embodiment of the present invention provides a technique for performing white balancing in a digital representation of an image based on illuminant white point estimation and chromatic adaptation correction. In particular, based on reference pixels taken from a reference image at least one illuminant white point estimate is determined in a color space having radially defined saturation. Thereafter, a chromatic adaptation correction vector is determined based on the at least one illuminant white point estimate. Corrected pixels are obtained by applying the chromatic adaptation correction vector to at least some of a plurality of uncorrected image pixels. In one embodiment of the present invention, the target image being corrected may comprise the reference image or another image.

The reference pixels, when converted to the color space, are compared with a saturation threshold value to determine those reference pixels representative of relatively low saturation colors. In a presently preferred embodiment, only those reference pixels having color space values that compare favorably with the threshold value are used in the determination of the at least one illuminant white point estimate.

In another embodiment of the present invention, the reference image may be divided up into a plurality of regions such that a corresponding plurality of illuminant white point estimates may be determined. Thereafter, at least some of the plurality of illuminant white point estimates may be used to determine an average illuminant white point estimate.

In yet another embodiment, if the illuminant white point estimate is substantially within a predetermined region within the color space, then the chromatic adaptation correction vector is determined by selecting a predetermined chromatic adaptation correction vector corresponding to the predetermined region.

Regardless of how the chromatic adaptation correction vector is determined, a preferred technique for applying the chromatic adaptation correction vector to the uncorrected image pixels is to transform the uncorrected image pixels into a cone response color space. A correction matrix based on the chromatic adaptation correction vector is applied to the transformed pixel values, and the corrected transformed pixel values are thereafter processed by an inverse transform to provide the corrected pixel values.

In another embodiment of the present invention, a circuit for white balancing a digital representation of an image is also provided. Similarly, the present invention may be incorporated into a device capable of performing white balancing, which device may be also capable of capturing or displaying the corrected image. For example, the present invention may be advantageously applied to a cellular telephone or other devices that employ image sensing technology. In particular, the present invention offers particular advantages in these devices where computational ease and efficiency are particularly important.

Referring now to the Figures, FIG. 1 is a flowchart illustrating processing in accordance with the present invention. Generally, the processing illustrated in FIG. 1 may be implemented entirely in hardware circuitry using, for example, state machines operating under the control of appropriately programmed logic circuits. Alternatively, the process may be implemented using a general purpose or specialized processor operating under the control of executable instructions that are stored in volatile or non-volatile memory, such as RAM or ROM or any other suitable storage element. Further still, as those of ordinary skill in the art will readily appreciate, a combination of hardware and software components may be equally employed.

Regardless, at Block 102, an estimate of an illuminant white point is determined. The "white point" of an illuminant refers to the spectral content of light provided by the illuminant. As described in greater detail below, the present invention performs illuminant white point estimation using a color space having a radially defined saturation parameter. By having saturation defined in this manner, thresholding operations may be readily performed that allow the determination of the illuminant white point estimate to be based substantially on low saturation color values. The use of low saturation color values in this manner reflects the assumption that low saturated colors are most likely to include the cast contributions from the illuminant used to ascertain the image.

When an illuminant white point estimate has been determined, processing continues at Block 104 for determination of a chromatic adaptation correction vector (CACV). In general terms, the CACV represents the degree of correction that needs to be applied to remove any cast contribution of the illuminant, thereby mimicking chromatic adaptation normally performed by the human visual system. In particular, the CACV is defined as that vector which connects the white point for a reference illuminant and the illuminant white point estimate determined at Block 102. As used herein, the reference illuminant represents an ideal illuminant having minimal or no cast contributions to the image. In the presently preferred embodiment, the reference illuminant is the so-called D65 illuminant, which is designed to approximate daylight.

At Block 106, the CACV determined at Block 104 is applied to the uncorrected pixels of a target image. Generally, the illuminant white point estimation of Block 102 and the CACV determination of Block 104 are based on reference pixels obtained from a reference image. In one embodiment of the present invention, described in greater detail below, the correction derived from the CACV is applied to a target image that is different from the reference image. However, this is not a requirement and the correction provided by the CACV may be equally applied to the reference image from which it was derived. As also described in greater detail below, application of the CACV occurs within a so-called cone response color space using a correction matrix determined based on the CACV. The output of Block 106 is corrected pixels in which the cast contribution from the original illuminant is removed or at least substantially minimized.

Figure 2:
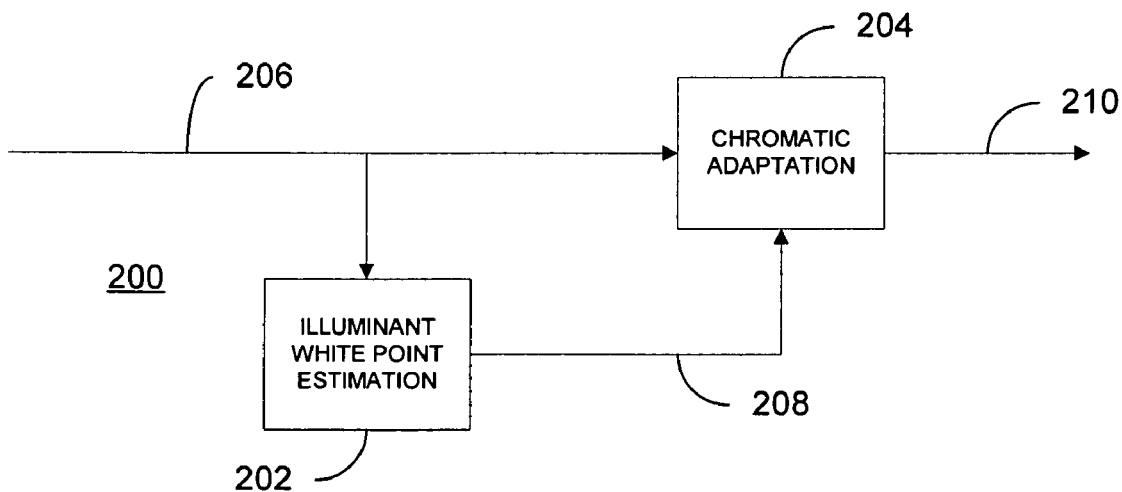
FIG. 2 is a schematic block diagram illustrating a circuit in accordance with the present invention.

Referring now to FIG. 2, a block diagram of a circuit that may be used to implement the present invention is illustrated. In particular, the circuit 200 comprises an illuminant white point estimation component 202 and a chromatic adaptation component 204. As used herein, a component is a constituent part of, either physically or logically, a circuit or another component. Both the illuminant white point estimation component 202 and the chromatic adaptation component 204 receive as input uncorrected pixels 206. In a presently preferred embodiment, the uncorrected pixels 206 comprise RGB values (red, green, blue values), although other color representation formats such as YCrCb or CIELAB color space representations may also be used. Generally, the components 202, 204 illustrated in FIG. 2 may be implemented entirely in hardware circuitry using, for example, state machines operating under the control of appropriately programmed logic circuits. Alternatively, the process may be implemented using a general purpose or specialized processor operating under the control of executable instructions that are stored in volatile or non-volatile memory, such as RAM or ROM or any other suitable storage element. Further still, as those of ordinary skill in the art will readily appreciate, a combination of hardware and software components may be equally employed. As shown, the output of the illuminant white point estimation component 202, the illuminant white point estimate 208, is provided to the chromatic adaptation component 204 where the determination and application of the CACV described above is performed. The chromatic adaptation component 204 provides corrected pixel values 210 as output. Once again, the preferred format for the corrected pixels 210 is RGB format. While FIGS. 1 and 2 provide a general illustration of the present invention, greater understanding thereof is provided with further reference to FIGS. 3-6.

Figure 3:
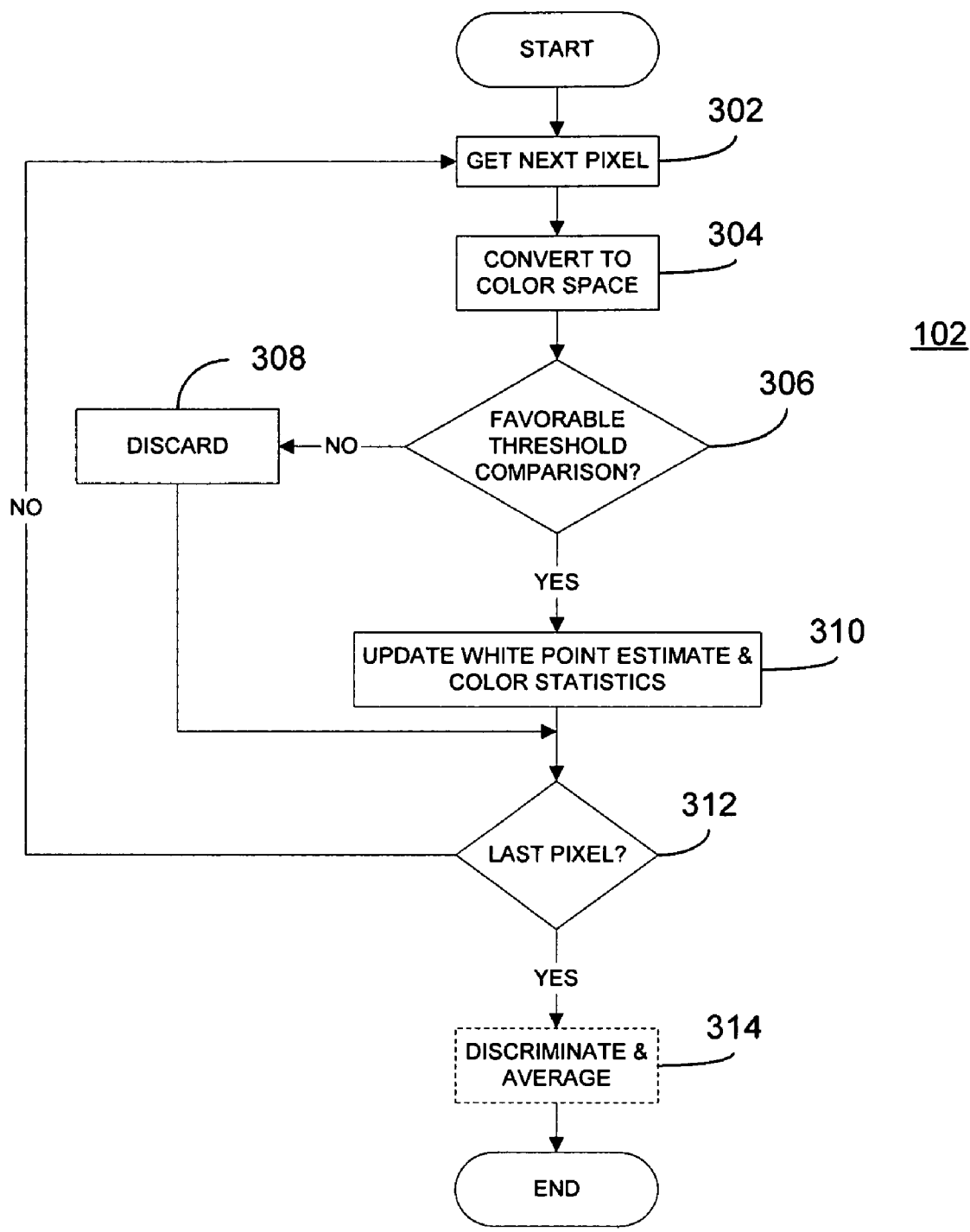
FIG. 3. is a flowchart illustrating the processing of a chromatic adaptation component in accordance with the present invention in greater detail.

Referring now to FIG. 3, a flow chart illustrating the processing preferred by the chromatic adaptation component 204 is illustrated in greater detail. Once again, the processing illustrated in FIG. 3 may be carried out using hardware and/or software implementations known to those having ordinary skill in the art. Beginning at Block 302, a pixel to be used in the estimation of the illuminant white point is obtained. Generally, the reference image used to estimate the illuminant white point will comprise a plurality of pixels. In fact, in the example of a camera equipped cellular telephone, the reference image and all other images operated upon in accordance with the present invention may comprise several million pixel values. Normally, the pixels are organized into frames, and within each frame, into rows or columns of pixels. Once an image is captured, the pixels may be read out from the acquiring sensor, beginning with the first pixel of the first row or column and progressing along the rows or columns until the last pixel of the last row or column has been read out. Because the manner of reading out the pixels is known ahead of time, each pixel inherently includes information which may be used to precisely identify the exact location of the pixel within the image.

Figure 4:
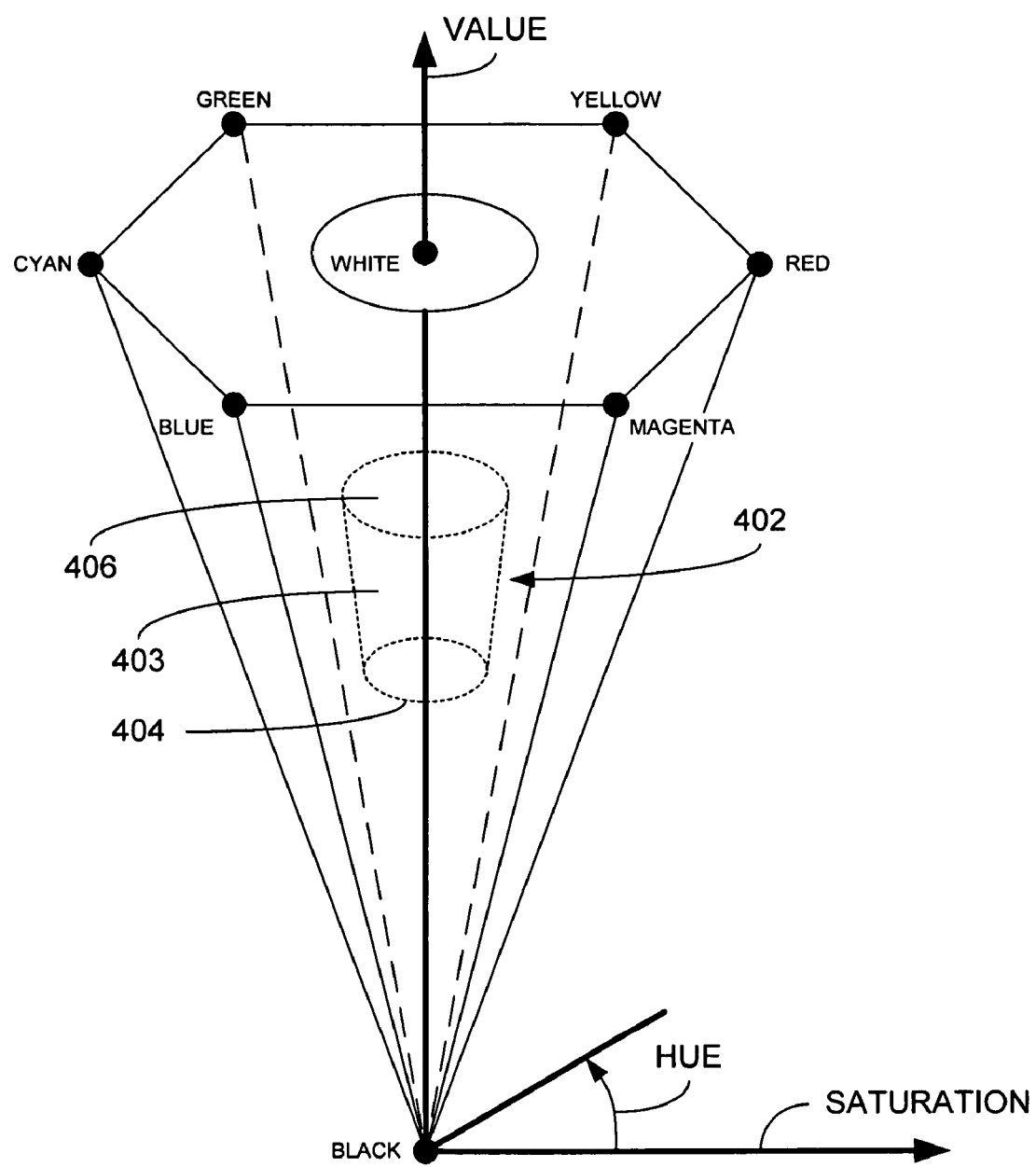
FIG. 4 illustrates a chromaticity diagram in a presently preferred color space useful for estimation of an illuminant white point in accordance with the present invention.

As each new pixel is acquired at Block 302, it is subsequently converted, at Block 304, to a color space that is better suited for the estimation of the illuminant white point. As known in the art, there are a variety of color spaces that may be generally categorized as linear or non-linear color spaces. While both linear and non-linear color spaces may be employed by the present invention, it is preferred to use linear color spaces for the process of illuminant white point estimation due to the decreased complexity needed to implement such linear color spaces. Further, it is preferred that the color space employed utilize a radially defined saturation parameter. Examples of such linear color spaces are the so-called Hue-Saturation-Value (HSV) or Hue-Saturation-Lightness (HSL) color space representations. Both the HSV and HSL representations are polar coordinate systems. Currently, the HSV system is preferred because it best preserves the perceptual differences between colors while still providing the ease of linear computation. A diagram illustrating the preferred HSV space is provided in FIG. 4. In particular, FIG. 4 illustrates a chromaticity diagram in which the three basis parameters of saturation, hue and value are represented along polar axes. As shown, the zero points for each of these parameters converge at a point used to represent the color black. Moving along the value coordinate, increasing saturation values of constituent colors within the polar coordinate space are shown. In particular, distinct points for green, yellow, red, magenta, blue and cyan colors are illustrated. Additionally, the color white is represented at all non-zero values occurring along the value axis. As noted above, the present invention preferably, but not necessarily, derives the illuminant white point estimate based on low saturation colors. To this end, a chromaticity constrained area 402 may be defined within the chromaticity diagram, as shown. The boundaries of the chromaticity constrained area 402 are defined by a saturation limit 403 and upper and lower value limits 404, 406. As depicted, the saturation threshold 403 is represented by the side surface of the cone section depicting the chromaticity constrained area 402. Likewise, the upper and lower value limits 404, 406 are represented by the top and bottom surfaces, respectively, of the chromaticity constrained area 402. These limits, which may be chosen as a matter of design choice, define a space within which color space values derived from the reference pixels being analyzed must reside.

To further simplify the pixel discrimination process, a planar projection of the HSV polar coordinate system can be used to represent and classify the chromaticity of an image with sufficient accuracy. This planar projection is accomplished using equations 1-5 set forth below:

$$X = R - \frac{B+G}{2}$$ Eq. 1

$$Y = 0.886 \cdot (G - B)$$ Eq. 2

$$\text{Saturation} = \sqrt{X^2 + Y^2}$$ Eq. 3

$$\text{Hue} = \frac{atg\left(\frac{X}{Y}\right)}{2\pi}$$ Eq. 4

-continued $$\text{Value} = \frac{R+G+B}{3}$$ Eq. 5

Figure 5:
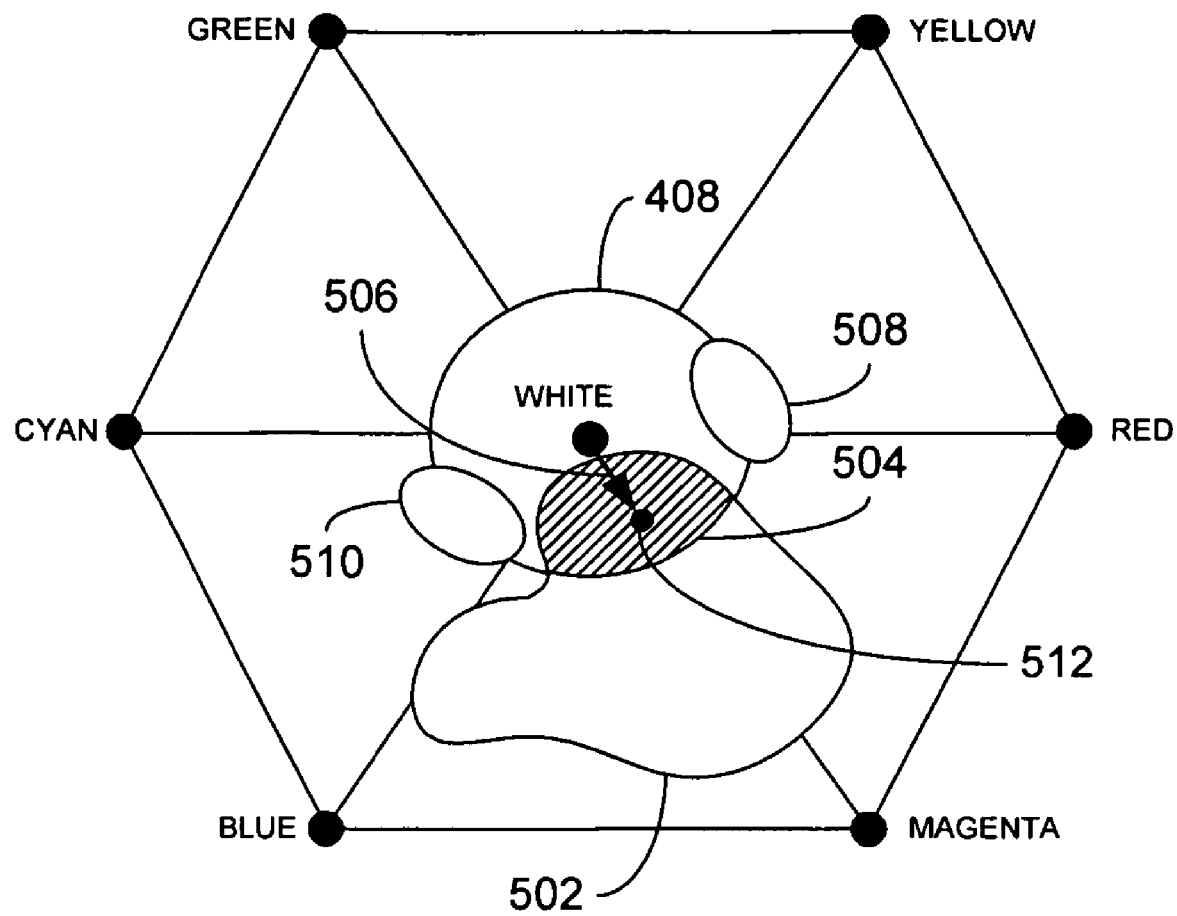
FIG. 5 illustrates a planar projection of the chromaticity diagram of FIG. 4.

The projection of the chromaticity constrained area 408 is illustrated in FIGS. 4 and 5. This planar projection of the chromaticity constrained area 408 allows the pixel discrimination process to be reduced to a simple saturation threshold comparison operation.

Referring once again to FIG. 3, processing continues at Block 306 where it is determined whether the color space representation of the pixel compares favorably with the saturation threshold. Once again, a favorable comparison with the saturation threshold arises when the color space representation of the pixel presents a saturation value less than the saturation threshold. If the threshold comparison is not favorable, processing continues at Block 308 where the color space value for the current pixel is discarded, i.e., it is not used in the determination of the illuminant white point estimate. Thereafter, it is determined at Block 312 whether the current pixel was the last pixel in the frame and, if not, processing continues once again at Block 302 with another pixel.

If, however, the threshold comparison at Block 306 is favorable, processing continues at Block 310, where at least one illuminant white point estimate is updated and color statistics for the reference image are accumulated. The manner in which at least one illuminant white point estimate is updated may be further explained with reference to FIG. 5. As shown in FIG. 5, the projection of the chromaticity constrained area 408 is centered around the white point of the reference illuminant, e.g., a D65 illuminant. Additionally, an image color distribution boundary 502 is shown establishing an intersection 504 with the projection of the chromaticity constrained area 408. The image color distribution boundary 502 represents the varying chromaticity of the entire reference image. The intersection 504 represents those colors found in the reference image meeting the saturation threshold comparison and that are therefore suitable for use in computing the illuminant white point estimate 512. Conceptually, the "center of weight" of the intersection 504 is considered to be representative of the illuminant white point. Thus, the illuminant white point estimate 512 can be determined by averaging the color space values of those pixels occurring within the intersection 504. Referring back to FIG. 3, Block 310 therefore updates an illuminant white point estimate by including the color space value of the current pixel in an average of all previous color space values contributing to that illuminant white point estimate by virtue of having favorable comparisons with the saturation thresholds.

As described thus far, it has been assumed that a single illuminant white point estimate is determined based on the entirety of the reference image. However, this is not a requirement and rather than calculating a single illuminant white point estimate, the reference image may be divided into a plurality of regions and a corresponding illuminant white point estimate calculated for each of these regions. The use of such regions allows the discrimination of certain regions that are best excluded from the determination of the reference image's illuminant white point estimate due to various factors. For example, it may be desirable to exclude regions in which the chromaticity of those regions is substantially uniform, i.e., large regions of substantially one color. Alternatively, it may be desirable to exclude those regions in which an insufficient number of pixels contribute to the illuminant white point estimate for that region. This type of information, indicating the desirability of including the illuminant white point estimate for a given region in the overall calculation of the illuminant white point estimate for the entire reference image (i.e., an indication of solid color region, contributing pixel percentage, etc.) is generally referred to as "color statistics" at Block 310.

Once the final pixel of the reference image has been processed as described above, a single illuminant white point estimate will have been calculated (in the case where no regions are employed) or a plurality of illuminant white point estimates will have been calculated (in the case where regions have been employed). Assuming the latter case, processing continues at Block 314, where the process of discriminating regions based on the color statistics determined at Block 310 occurs. Once those regions determined to be suitable for inclusion in the illuminant white point estimate calculation have been determined, their corresponding illuminant white point estimates may be averaged together to provide an averaged illuminant white point estimate. The resulting illuminant white point estimate may thereafter be used in the determination of the CACV as described above and in further detail below.

Figure 6:
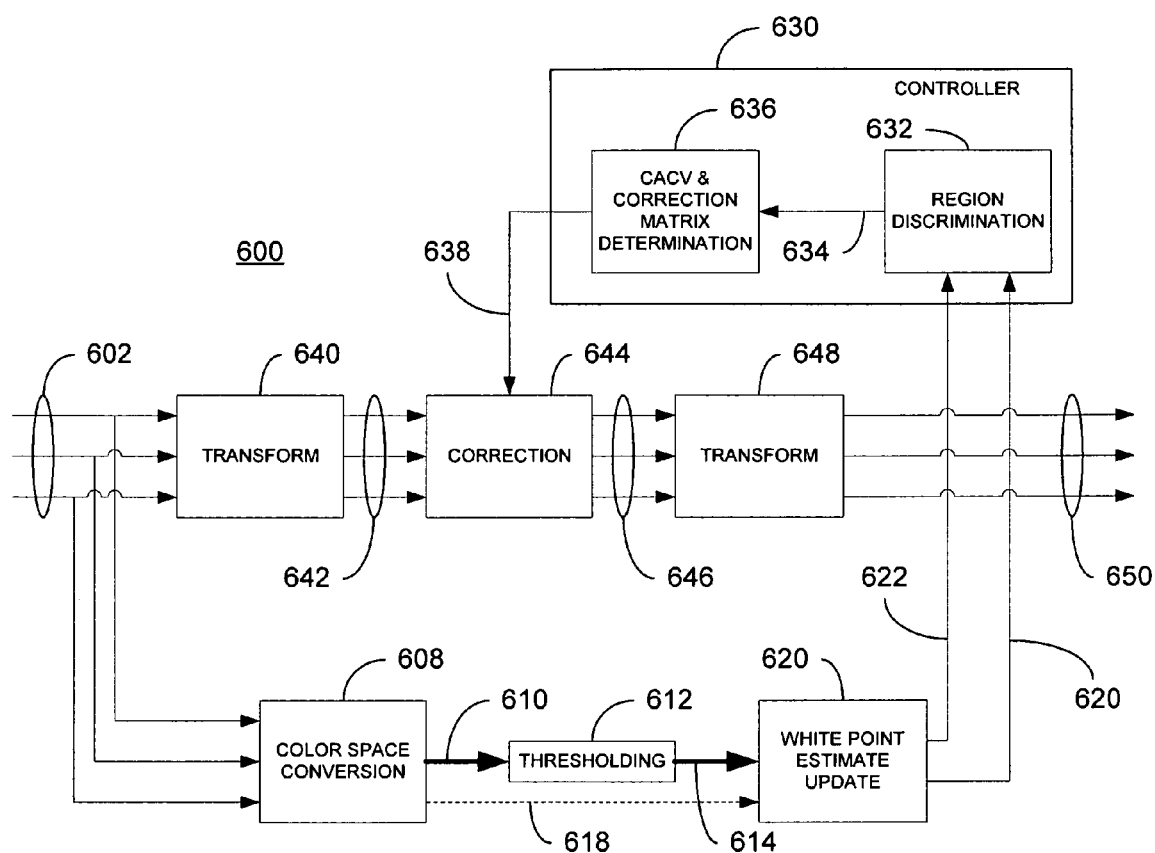
FIG. 6 is a schematic block diagram illustrating the components of FIG. 2 in greater detail.

Referring now to FIG. 6, a block diagram of a circuit 600 illustrating the components of FIG. 2 in greater detail is provided. In particular, the illuminant white point estimation component 202 is further illustrated by the color space conversion component 608, the thresholding component 612 and the white point estimation update component 616; whereas the chromatic adaptation component 204 is further illustrated by the controller 630, the transform component 640, the correction component 644 and the inverse transform component 648. As shown, an uncorrected pixel 602, illustrated in RGB format, is provided as input to the color space conversion component 608 that converts the uncorrected pixel 602 into its color space values at described above, i.e., from RGB to HSV. Note that the circuit 602 preferably operates on a single pixel at a time. The resulting color space value 610 is provided to the thresholding component 612 which performs the previously described thresholding operation based on a saturation threshold value, which may be fixed or variable. Those color space values that compare favorably with the saturation threshold 614 are provided to the white point estimate update component 616 that computes the illuminant white point estimate 620 and the corresponding color statistic 622 (assuming, as in this example, the use of a plurality of image regions). To this end, region identifying information 618 is schematically illustrated as being provided to the white point estimate update component 616 by the color space conversion component 608. As noted above, knowledge about the specific location of a given pixel within the image may be inferred from its position within the string of pixels being read from the reference image. Given that the plurality of regions within the image are defined by fixed boundaries, this knowledge of specific location of a pixel may be used to determine which region that pixel lies in. Consequently, it can be determined which illuminant white point estimate the current pixel should contribute to. When the last pixel for the reference image has been processed by the color space conversion component 608, the threshold component 612 and the white point estimate update component 616, the illuminant white point estimates corresponding to each region 620 as well as the color statistics 622 likewise corresponding to each region, are provided to a controller 630, which, in a presently preferred embodiment, comprises a suitably programmed microprocessor, microcontroller, digital signal processor, or similar device as known to those having ordinary skill in the art.

The controller 630 implements a region discrimination component 632 that uses the color statistics 622 for each region to determine which regions should contribute to the average illuminant white point estimate 634. In turn, the average illuminant white point estimate 634 is provided to a CACV and correction matrix determination component 636 which first determines a CACV based on the illuminant white point estimate 634. Referring once again to FIG. 5, the CACV 506 is a vector between the reference illuminant white point and the illuminant white point estimate 512. In practice, it is anticipated that illuminants used to provide images will fall into one of the relatively small number of known illuminant sources. As a consequence, one or more predetermined regions within the color space corresponding to these known illuminants may be defined. This is illustrated in FIG. 5 by a first predetermined region 508 and a second predetermined region 510. In particular, the first predetermined region 508 corresponds to tungsten-based illuminant sources that tend to have reddish-yellow white points. In contrast, the second predetermined region 510 corresponds to florescent illuminant sources that have white points trending toward the blue region. Note that the projection of the chromaticity constrained area 408 is defined such that it at least partially overlaps each of the predetermined regions 508, 510. As noted below, each CACV is used to determine a correction matrix which may be used in a cone response color space (as described below) to perform the color correction needed to correct the otherwise uncorrected pixel 602. In those instances in which the CACV 506 falls within a predetermined region 508, 510, a predetermined CACV and a corresponding predetermined correction matrix may be used. In this instance, the selected correction matrix 638 is thereafter provided to the correction component 644.

In the case where the illuminant white point estimate 634 does not fall within a predetermined region 508, 510 a correction matrix may be calculated using the a linearized Bradford transform, as known in the art. The cone response color space is so-called perceptual color space, which more accurately represents color as the human visual system perceives them. The linearized Bradford transform converts values to the cone response color space, which is a preferred space for performing chromatic adaptation with the present invention. The correction matrix 638 determined using the linearized Bradford transform is thereafter provided to the correction component 644 for use on subsequent pixels from a subsequent image.

In parallel with the above-described processing, the uncorrected pixel 602 is also provided to a transform component 640 which performs a transform to the cone response color space thereby providing transform pixel value 642. Once again, the transform performed by the transform component 640 is derived from the linearized Bradford transform. The resulting transform pixel value 642 are thereafter multiplied with the correction matrix 630 and the correction component 644 to provide corrected transform pixel value 646. In keeping with the presently preferred pipelined structure of FIG. 6, the correction matrix 638 applied by the correction component 644 is that derived based on a previous image, i.e., the reference image. Each corrected transform pixel value 646, in turn, is provided to the inverse transform component 648, which, as its name would imply, performs the inverse of the transform used by the transform component 640. Once again, the inverse transform component 648 implements an inverse transform that is well known in the art. The output of the inverse transform component 648 is a corrected pixel 650 in the desired RGB format.

Figure 7:
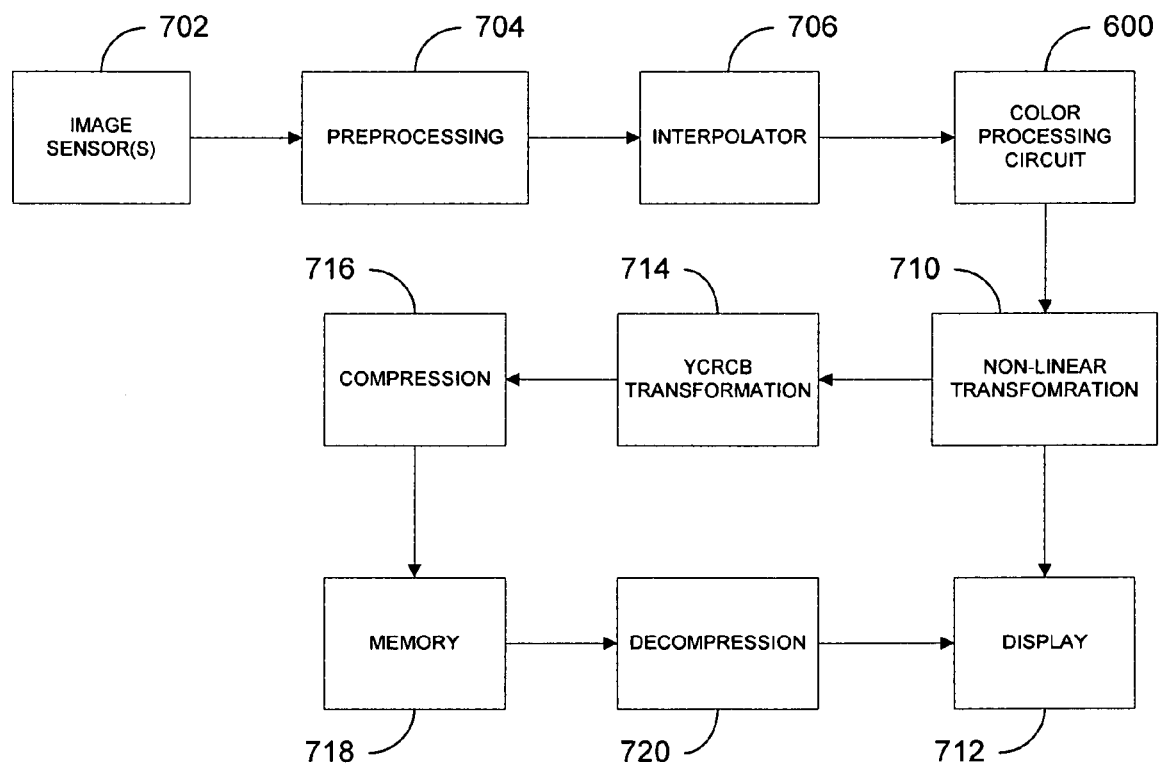
FIG. 7 is block diagram of a device incorporating an exemplary hardware configuration suitable for implementing various embodiments of the present invention.

Referring now to FIG. 7, a block diagram of a device 700 incorporating a color processing circuit 600 in accordance with the present invention is illustrated. In particular, device 700 comprises at least one image sensor 702 in communication with a color processing circuit 600 in accordance with the present invention, which in turn is in communication with a display 712. Similarly, the device 700 illustrated in FIG. 7 includes components as may be found in any digital camera or camera capable cellular telephone. However, as noted above, the present invention is not limited to devices that incorporate image sensors 702 or displays 712.

The one or more image sensors 702, which may be CMOS or CCD sensors, provide raw image data to a preprocessing component 704. As known in the art, the image sensor 702 may require processing, performed by the preprocessing component 704, to eliminate sensor artifacts, offsets or non-linearities from the raw data. The preprocessed raw data is thereafter provided to an interpolator component 706, which translates the raw data to color data in a suitable format such as RGB. For example, many image sensors employ the so-called Bayer filter mosaic, which attempts to mimic the color sensing capabilities of the human eye. However, the resulting raw data output by the Bayer filter mosaic is not suitable color data in the sense of RGB values. In this case, any of a number of well-known algorithms may be used to perform the interpolation processing performed by the interpolator component 706. Regardless, the RGB pixel values are thereafter provided to the color processing circuit 600 as shown. In practice, the RGB pixel values input to the color processing circuit 600 are provided as a continuous stream as they are read out from the image sensor 702 and prior to their storage in memory. Because the color processing circuit 600 can operate on a target image comprising unfiltered pixels based on a CACV determined using a prior reference image, as described above, the configuration in FIG. 7 allows "on the fly" processing of uncorrected pixel values without the need to first store the incorrect pixel values in memory. Of course, this is not a limitation of the present invention as the processing described above may be equally applied to a stored image.

Regardless, the corrected RGB pixel values provided as output by the color processing circuit 600 are thereafter provided to a non-linear transformation component 710. For example, the non-linear transformation component 710 may implement a gamma transformation, as known in the art, to adjust tonal distribution within the image as desired. Where it is desired to display the corrected pixel values immediately, the output of the non-linear transformation component 710 may be directly supplied to the display 712. For example, this may be desirable where the device 700 utilizes the display 712 as an imaging preview indicator for use with a digital camera or camera equipped cellular telephone. In this instance, the chain of components from the image sensor 702 to the display 712, as previously described, may be used to continuously display images at the rate provided by the image sensor 702 without intermediate storage. In this mode of operation, the color processing circuit 600 may use a first image read from the image sensor 702 as a reference image to determine a correction matrix as described above. Simultaneously, a previously-determined correction matrix may be applied to that first image by the color processing circuit 600. Thereafter, the correction factor determined by the color processing circuit 600 based on the first image may be applied to a second and subsequent image provided by the image sensor 702. This process of continuously determining new correction factors and applying them to subsequent images provided by the image sensor 702 allows such images to be pipelined directly to the display 712 without the need to store such images in order to determine suitable correction factors particular to each image.

Of course, this pipeline capability does not preclude the ability to store corrected images in memory. To this end, the output of the non-linear transformation component 710 may also be provided to a YCrCb transformation component 714, which transforms the corrected image pixels into a format suitable for input to a compression algorithm implemented by the compression component 716, as shown. The output of the compression component 716, which may implement, for example, a JPEG compression scheme, may thereafter be stored in a memory component 718. Thereafter, if desired, the corrected image may be recalled for display. To this end, a decompression component 720 is used to decompress the compressed image stored in memory 718 and thereafter provide a decompressed image to the display 712. Once again, the decompression algorithm employed by the decompression component 720 may comprise JPEG decoding, as known in the art.

It should be noted that the corrected pixels may be optionally displayed in a manner suitable to the device in which the presented invention is implemented. For example, as noted above relative to FIG. 7, in a cellular telephone having an image capture capability, the corrected pixels may be provided to a display screen. Alternatively, where processing in accordance with the present invention is performed within a printer operating upon a stored image, the action of displaying the corrected pixels may comprise those operations necessary to print the corrected pixels.

A wide variety of devices may incorporate, or otherwise benefit from use of, the present invention. For example, digital cameras, digital camcorders or any other image capture devices may employ processing in accordance with the present invention. Additionally, devices within a wireless communication system may incorporate or otherwise benefit from the present invention. Devices within wireless communication systems may include wireless handsets, such as cellular telephones or handheld radios, as well as network infrastructure equipment, such as base stations, switches, routers, etc. Each of these devices may perform the techniques described above or serve as a receiver or transmitter of images that have been processed in accordance with the techniques described above. For example, a particular element within the network infrastructure may receive unprocessed images from wireless devices and perform the processing described above. Alternatively, network elements, or even other wireless communication devices, may simply transmit and received images that were processed elsewhere in accordance with the present invention.

As described above, the present invention provides a method for performing white balancing in digital images. Because the present invention performs chromatic adaptation in a perceptual color space, i.e., the core response color space, high quality, computationally efficient white balancing is provided. Additionally, using white point estimation computed in a linear color space, CACVs may be readily determined. For at least these reasons, the present invention represents an advancement over prior art techniques.

It is therefore contemplated that the present invention cover any and all modifications, variations or equivalents that fall within the spirit and scope of the basic underlying principles disclosed above and claimed herein.

What is claimed is:

1. A method for performing white balancing in a digital representation of a target image comprising uncorrected image pixels, the method performed by a processor and comprising:

determining, in a color space having a radially defined saturation coordinate and based upon at least some of a plurality of reference pixels constituting a reference image, at least one illuminant white point estimate;

determining, in the color space having a radially defined saturation coordinate, a chromatic adaptation correction vector between a white point reference illuminant and a point derived from the at least one illuminant white point estimate; and applying the chromatic adaptation correction vector to at least some of the uncorrected image pixels to provide corrected pixels.

2. The method of claim 1, wherein the target image is the reference image or an image other than the reference image.

3. The method of claim 1, wherein the reference pixels comprise RGB values and wherein determining the at least one illuminant white point estimate further comprises:

converting the at least some of the plurality of reference pixels from RGB values into color space values defined within the color space.

4. The method of claim 3, wherein the color space is an HSV color space.

5. The method of claim 3, further comprising determining the at least one illuminant white point estimate based on color space values that compare favorably with a saturation threshold value.

6. The method of claim 5, further comprising determining the at least one illuminant white point estimate by averaging those color space values that compare favorably with the saturation threshold value.

7. The method of claim 1, further comprising determining whether the at least one illuminant white point estimate is substantially within a predetermined region in the color space and, when the at least one illuminant white point estimate is substantially within the predetermined region, determining the chromatic adaptation correction vector by selecting a predetermined chromatic adaptation correction vector corresponding to the predetermined region.

8. The method of claim 1, further comprising determining a plurality of illuminant white point estimates corresponding to a plurality of regions within the reference image and averaging at least some of the plurality of illuminant white point estimates to provide an averaged illuminant white point estimate, wherein determining the chromatic adaptation correction vector further comprises determining the chromatic adaptation correction vector based on the averaged illuminant white point estimate.

9. The method of claim 1, wherein determining the chromatic adaptation correction vector further comprises determining a difference vector between the at least one illuminant white point estimate and a reference illuminant white point.

10. The method of claim 1, wherein applying the chromatic adaptation correction vector further comprises:

determining a correction matrix based on the chromatic adaptation correction vector;

applying a transform to the at least some of the uncorrected image pixels to provide transformed pixel values in a cone response color space;

applying the correction matrix to the transformed pixel values to provide corrected transformed pixel values; and applying an inverse transform to the corrected transformed pixel values to provide the corrected pixel values.

11. A circuit for white balancing in a digital representation of a target image comprising uncorrected image pixels, the circuit comprising:

an illuminant white point estimation component operative to receive at least some of a plurality of reference pixels constituting a reference image and to determine, in a color space having a radially defined saturation coordinate, at least one illuminant white point estimate based on the at least some of the plurality of reference pixels; and a chromatic adaptation component, coupled to the illuminant white point estimation component, operative to receive at least some of the uncorrected image pixels and to determine a chromatic adaptation correction vector between a white point reference illuminant and a point derived from the at least one illuminant white point estimate in the color space having a radially defined saturation coordinate and to apply the chromatic adaptation correction vector to the at least some of the uncorrected image pixels to provide corrected pixels.

12. The circuit of claim 11, wherein the reference pixels comprise RGB values and wherein the illuminant white point estimation component further comprises:

a color space conversion component operative to receive the reference pixels and to convert the at least some of the plurality of reference pixels from RGB values into color space values defined within the color space;

a thresholding component, coupled to the color space conversion component, operative to determine color space values that compare favorably with a saturation threshold value; and a white point estimation update component, coupled to the thresholding component, operative to determine the at least one illuminant white point estimate based on the color space values that compare favorably with the saturation threshold.

13. The circuit of claim 12, wherein the white point estimation update component is further operative to receive region identifying information corresponding to each color space value and to determine a plurality of illuminant white point estimates corresponding to a plurality of regions within the reference image.

14. The circuit of claim 13, wherein the chromatic adaptation component is further operative to determine an average of the plurality of illuminant white point estimates to provide an averaged illuminant white point estimate and to determine the chromatic adaptation vector based on the averaged illuminant white point estimate.

15. The circuit of claim 11, wherein the chromatic adaptation component is further operative to determine whether the at least one illuminant white point estimate is substantially within a predetermined region in the color space and, when the at least one illuminant white point estimate is substantially within the predetermined region, determining the chromatic adaptation correction vector by selecting a predetermined chromatic adaptation correction vector corresponding to the predetermined region.

16. The circuit of claim 11, wherein the chromatic adaptation component further comprises:

a transform component operative to receive the at least some of the uncorrected image pixels and to apply a transform to the at least some of the uncorrected image pixels to provide transformed pixel values in a cone response color space;

a correction component, coupled to the transform component, operative to apply the chromatic adaptation correction vector to the transformed pixel values to provide corrected transformed pixel values; and an inverse transform component, coupled to the correction component, operative to apply an inverse transform to the corrected transformed pixel values to provide the corrected pixel values.

17. A device capable of white balancing a digital representation of a target image comprising uncorrected image pixels, the device comprising:

at least one image sensor that first provides a digital representation of a reference image comprising a plurality of reference pixels and subsequently provides the digital representation of the target image;

a memory component; and a color processing circuit, in communication with the at least one image sensor and the memory component, operative to determine, in a color space having a radially defined saturation coordinate, at least one illuminant white point estimate based on at least some of the plurality of reference pixels and to determine a chromatic adaptation correction vector between a white point reference illuminant and a point derived from the at least one illuminant white point estimate in the color space having a radially defined saturation coordinate, and subsequently to apply the chromatic adaptation correction vector to the at least some of the uncorrected image pixels, thereby providing corrected pixels, prior to storing any pixels corresponding to the target image in the memory component.

18. The device of claim 17, further comprising a display, in communication with the color processing circuit, operative to display the corrected pixels.

19. The device of claim 18, further comprising a compression component, in communication with the color processing circuit and the memory component, operative to compress the corrected pixels corresponding to the target image to provide compressed pixels and to store the compressed pixels in the memory component.

20. The device of claim 19, further comprising a decompression component, in communication with the memory component and the display, operative to decompress the compressed pixels to provide decompressed pixels and to provide the decompressed pixels to the display.

21. An image comprising a plurality of corrected pixels, said image generated in accordance with a method for performing balancing, said method comprising using a processor to perform a method of:

applying a chromatic adaptation correction vector to at least a portion of an uncorrected image to provide said plurality of corrected pixels, said uncorrected image comprising a plurality of uncorrected pixels;

determining at least one illuminate white point estimate based upon at least some of a plurality of reference pixels constituting a reference image; and wherein said chromatic correction vector was generated between a white point reference illuminant and a point derived from the at least one illuminant white point estimate in a color space having a radially defined saturation coordinate.

22. In a device, a method for receiving an image, the method comprising using a processor to perform a method of;

receiving the image that comprises at least one corrected pixel;

determining at least one illuminate white point estimate based upon at least some of a plurality of reference pixels constituting a reference image;

wherein the at least one corrected pixel is provided by applying a chromatic adaptation correction vector to at least a portion of an uncorrected image to provide said at least one corrected pixel, said uncorrected image comprising a plurality of uncorrected pixels, and wherein said chromatic correction vector was generated between a white point reference illuminant and a point derived from the at least one illuminant white point estimate in a color space having a radially defined saturation coordinate.

23. In a device, a method for transmitting an image, the method comprising using a processor to perform a method of;

transmitting the image that comprises at least one corrected pixel;

determining at least one illuminate white point estimate based upon at least some of a plurality of reference pixels constituting a reference image;

wherein the at least one corrected pixel is provided by applying a chromatic adaptation correction vector to at least a portion of an uncorrected image to provide said at least one corrected pixel, said uncorrected image comprising a plurality of uncorrected pixels, and wherein said chromatic correction vector was generated between a white point reference illuminant and a point derived from the at least one illuminant white point estimate in a color space having a radially defined saturation coordinate.

24. A computer-readable medium comprising instructions that when executed perform a method of:

determining, in a color space having a radially defined saturation coordinate and based upon at least some of a plurality of reference pixels constituting a reference image, at least one illuminant white point estimate;

determining, in the color space having a radially defined saturation coordinate, a chromatic adaptation correction vector between a white point reference illuminant and a point derived from the at least one illuminant white point estimate; and applying the chromatic adaptation correction vector to at least some uncorrected image pixels to provide corrected pixels.

25. The computer-readable medium of claim 24, wherein the plurality of reference pixels comprise RGB values and wherein determining the at least one illuminant white point estimate further comprises:

converting the at least some of the plurality of reference pixels from RGB values into color space values defined within the color space.

26. The computer-readable medium of claim 24, wherein the color space is an HSV color space.

27. The computer-readable medium of claim 24, wherein the computer readable medium comprises a hard disk or a compact disk.

28. A device comprising:

means for determining, in a color space having a radially defined saturation coordinate and based upon at least some of a plurality of reference pixels constituting a reference image, at least one illuminant white point estimate;

means for determining, in the color space having a radially defined saturation coordinate, a chromatic adaptation correction vector between a white point reference illuminant and a point derived from the at least one illuminant white point estimate; and means for applying the chromatic adaptation correction vector to at least some uncorrected image pixels to provide corrected pixels.

29. The device of claim 28, wherein the plurality of reference pixels comprise RGB values, the device further comprising:

means for converting the at least some of the plurality of reference pixels from RGB values into color space values defined within the color space;

means for determining the at least one illuminant white point estimate based on color space values that compare favorably with a saturation threshold value; and means for determining the at least one illuminant white point estimate by averaging those color space values that compare favorably with the saturation threshold value.

30. The device of claim 28, further comprising means for determining a plurality of illuminant white point estimates corresponding to a plurality of regions within the reference image and averaging at least some of the plurality of illuminant white point estimates to provide an averaged illuminant white point estimate, wherein the means for determining the chromatic adaptation correction vector further comprises mean for determining the chromatic adaptation correction vector based on the averaged illuminant white point estimate.

31. The device of claim 28, wherein the device is a wireless telephone.

* * * * *